United States Patent [19]
Coelho

[11] Patent Number: 5,566,250
[45] Date of Patent: Oct. 15, 1996

[54] PROCESS AND APPARATUS FOR PSEUDO-SIMD PROCESSING OF IMAGE DATA

[75] Inventor: Rohan Coelho, Hillsboro, Oreg.

[73] Assignee: Intel Corporation, Santa Clara, Calif.

[21] Appl. No.: 400,546

[22] Filed: Mar. 8, 1995

Related U.S. Application Data

[63] Continuation of Ser. No. 182,758, Jan. 14, 1994, abandoned.

[51] Int. Cl.$^6$ ..................................... G06K 9/36
[52] U.S. Cl. ..................... 382/276; 382/307; 364/723; 364/710.14; 364/715.02
[58] Field of Search ............................. 382/276, 302, 382/305, 304, 307; 364/723, 710.14, 715.02; 348/390, 395, 415, 417, 422

[56] References Cited

U.S. PATENT DOCUMENTS

| | | | |
|---|---|---|---|
| 4,717,957 | 1/1988 | Santamäki et al. | 348/415 |
| 5,128,759 | 7/1992 | Matsunaga | 348/415 |
| 5,157,388 | 10/1992 | Kohn | 364/723 |
| 5,291,283 | 3/1994 | Kondo et al. | 348/415 |
| 5,309,527 | 5/1994 | Ohki | 348/415 |

*Primary Examiner*—Leo Boudreau
*Assistant Examiner*—Chris Kelley
*Attorney, Agent, or Firm*—Steve Mendelsohn; William H. Murray

[57] ABSTRACT

Methods and apparatuses for processing pixel images using conventional non-parallel processors. At least two values corresponding to at least two different pixels of the image are loaded into a register of a conventional non-parallel processor. An operation is then performed on the register, whereby the operation is applied to the multiple values in the register in parallel. In preferred embodiments of the present invention, vector dequantization is implemented on either 32-bit or 16-bit conventional non-parallel processors by (1) loading two (or more) pixel values corresponding to a previous image into a first register, (2) loading two pixel differences corresponding to a current image into a second register, and (3) generating two pixel values corresponding to the current image by generating the sum of the values in the first and second registers.

18 Claims, 2 Drawing Sheets

PROCESS AND APPARATUS FOR PSEUDO-SIMD PROCESSING OF IMAGE DATA

This is a continuation of Ser. No. 08/182,758 filed on Jan. 14, 1994 now abandoned.

BACKGROUND OF THE INVENTION

1. Field of the Invention

The present invention relates to image processing, and, in particular, to processes and apparatuses for processing image dam using non-parallel processors.

2. Description of the Related Art

It is desirable to perform image processing using conventional non-parallel processors. It is particularly desirable to process digital video images in real time using such processors. One of the problems associated with such processing is that conventional non-parallel processors have processing bandwidth limitations that often preclude the real-time implementation of many conventional image processing techniques for digital video images of desired sizes and resolutions.

When digital images are processed using non-parallel processors, it is conventional to process the image pixel data serially, i.e., by repeating the application of each mathematical operation to each pixel value of each row of the image independently.

For example, in the known video compression technique of vector quantization, all or part of a frame of video data is encoded based upon the differences between corresponding pixels in the previous frame and the current frame of data. When vector dequantization is performed to decode an image that was compressed using vector quantization, each pixel value $c_i$ of the current frame is generated by adding a corresponding difference value $d_i$ to the corresponding pixel value $p_i$ of the previously decoded frame. In conventional non-parallel processing, this is done by applying the addition operation once for each pixel independently, for example, in a loop that is repeated for each pixel of each row of each frame of video data.

Because of the processing bandwidth limitations of conventional non-parallel processors, conventional image processing techniques (such as vector dequantization) cannot be performed in real time on images of certain sizes and resolutions due to the volume of data to be processed.

What are needed are improvements in conventional image processing techniques for processing images of desired sizes and resolutions that meet the processing bandwidth limitations of conventional non-parallel processors and thereby provide real-time processing capabilities.

It is accordingly an object of this invention to overcome the disadvantages and drawbacks of the known art and to provide digital image processing techniques that improve the capability of conventional non-parallel processors to process images of desired sizes and resolutions in real time.

It is a particular object of this invention to provide an image processing system with improved capabilities-for performing vector dequantization of encoded video images in real time.

Further objects and advantages of this invention will become apparent from the detailed description of a preferred embodiment which follows.

SUMMARY OF THE INVENTION

The present invention is a computer-implemented process and apparatus for transforming signals corresponding to pixel images. A first signal is provided corresponding to a first pixel of an image and a second signal is provided corresponding to a second pixel of the image. A first value corresponding to the first signal is loaded into a first register of a non-parallel processor. A second value corresponding to the second signal is loaded into the first register. The first and second signals are transformed by performing an operation on the first register, whereby the operation is applied to the first and second values in parallel.

In a preferred embodiment of the present invention, a first previous signal corresponding to a first previous pixel of a previous image and a second previous signal corresponding to a second previous pixel of the previous image are provided. A first previous pixel value $p_1$ corresponding to the first previous pixel is loaded into the first register. A second previous pixel value $p_2$ corresponding to the second previous pixel is loaded into the first register. A first difference signal and a second difference signal corresponding to a current image are provided. A first difference value $d_1$ corresponding to the first difference signal is loaded into a second register of the non-parallel processor. A second difference value $d_2$ corresponding to the second difference signal is loaded into the second register. A first current pixel value $c_1$ and a second current pixel value $c_2$ are generated by adding the contents of the first register and the contents of the second register in a single operation. A first current signal is generated in accordance with the first current pixel value $c_1$ and a second current signal is generated in accordance with the second current pixel value $c_2$, wherein the first and second current signals correspond to two pixels of the current image.

BRIEF DESCRIPTION OF THE DRAWINGS

Other objects, features, and advantages of the present invention will become more fully apparent from the following detailed description of the preferred embodiment, the appended claims, and the accompanying drawings in which:

DESCRIPTION OF THE PREFERRED EMBODIMENT(S)

The present invention is directed to processes and apparatuses for processing pixel images using non-parallel processors that implement image processing techniques that simulate processing on parallel processors. According to this invention, at least two values corresponding to at least two different pixels of an image are loaded into a register of a non-parallel processor. An operation is then performed on the register, whereby the operation is effectively applied to the register values in parallel, thereby providing pseudo-parallel processing on a non-parallel processor. Such processing is referred to as pseudo-SIMD, where SIMD stands for "single-instruction, multiple-data"—a type of parallel processing in which a single operation is concurrently applied to multiple data values.

Figure 1:
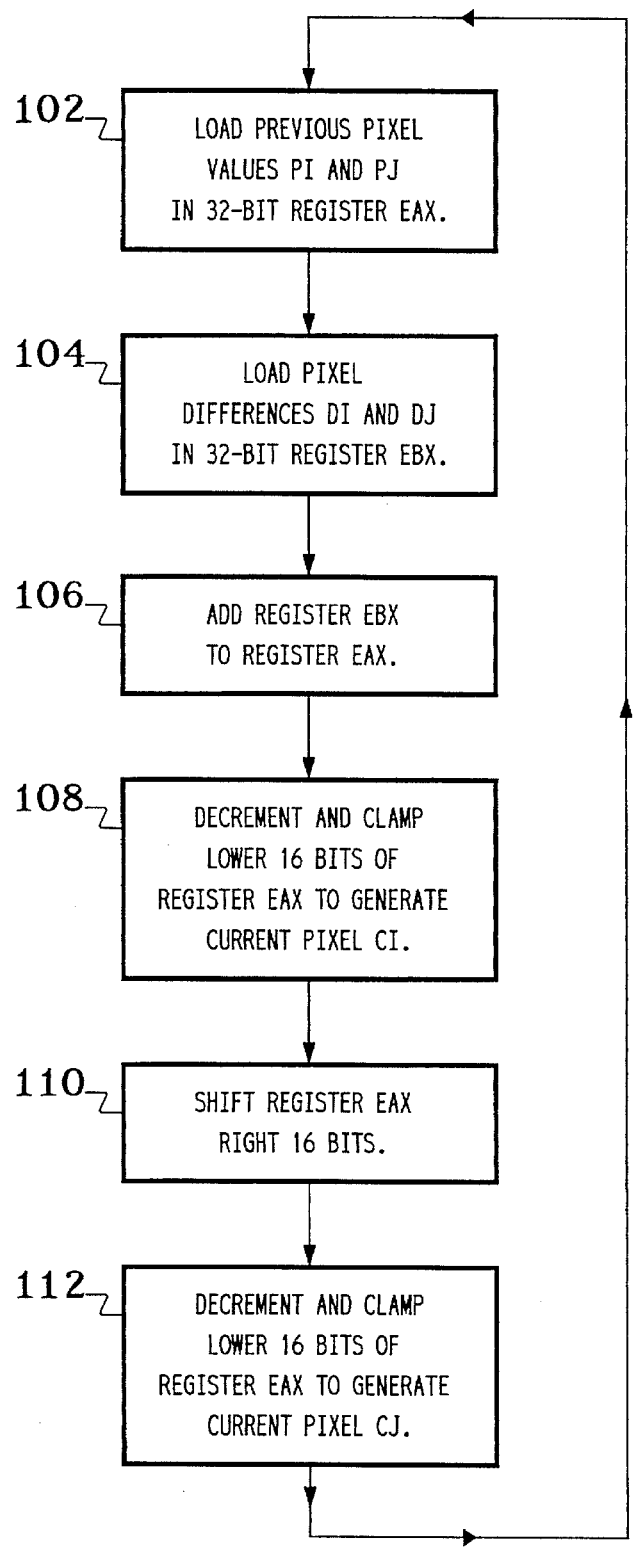
FIG. 1 is a process flow diagram of the processing implemented by a vector dequantization system, according to a preferred embodiment of the present invention.

Referring now to FIG. 1, there is shown a process flow diagram of the processing implemented by vector dequantization system 100, according to a preferred embodiment of the present invention. System 100 is preferably implemented on a non-parallel 32-bit processor, such as an Intel® x86 processor. An Intel® x86 processor may be an Intel® 286, 386, 486, or Pentium® processor.

An Intel® x86 processor has 32-bit registers, such as registers eax and ebx. Register eax contains four 8-bit fields. The lowest and second lowest 8-bit fields may be directly and independently addressed as al and ah, respectively. In addition, fields al and ah may be addressed directly and collectively as the 16-bit field ax. To load data into the two highest 8-bit fields, the data are loaded into field ctr and shifted left. Similarly, to access data stored in the two highest 8-bit fields, the data are first shifted right and then accessed directly from field at. All 32 bits of register ear may also be loaded at one time with a DWORD read instruction. Register ebx has an analogous 16-bit field bx, which comprises 8-bit fields bl and bh.

System 100 implements vector dequantization processing to decode encoded video images in a pseudo-SIMD fashion. In vector dequantization processing, the pixel values of a current image are generated by adding pixel differences associated with the current image to the corresponding pixel values of a previous image. System 100 accomplishes pseudo-SIMD vector dequantization processing by (1) loading two 8-bit pixel values corresponding to two pixels of the previous frame into 32-bit register eax, (2) loading two 8-bit pixel differences corresponding to the same two pixels of the current frame into 32-bit register ebx, and then (3) applying the addition operation to the loaded registers, where the data loaded in the registers are treated like single 32-bit values, to generate values corresponding to the two pixels of the current frame.

More particularly, means 102 of system 100 loads 8-bit unsigned pixel values $p_i$ and $p_j$ into 32-bit register ear. Pixel values $p_i$ and $p_j$ are preferably components (e.g., Y, U, or V) of two adjacent pixels of the previous frame of video dam. Means 102 preferably (1) loads pixel value $p_j$ into field al of register eax, (2) shifts register eax left 16 bits, and (3) loads pixel value $p_i$ into field al. As such, means 102 loads pixel value $p_i$ into field al and pixel value $p_j$ into the second highest field of register eax, while the bits of field ah and the highest field of register eax are preferably set to zero.

Pixel differences d are preferably 8-bit unsigned values that represent the values from −128 to +127. For example, the unsigned pixel difference d of (0000 0000) corresponds to the value −128, while the unsigned pixel difference d of (1111 1111) corresponds to the value +127. In one preferred embodiment, means 104 uses processing analogous to means 102 to load pixel differences $d_i$ and $d_j$ corresponding to the current video frame into 32-bit register ebx. In an alternative preferred embodiment, pairs of 8-bit pixel differences are stored in tables as 32-bit values that are designed to be loaded by means 104 into register ebx using a single DWORD read instruction.

Means 106 then performs an addition operation on registers ear and ebx to add the contents of register ebx to the contents of register eax.

Those skilled in the art will understand that the addition of an 8-bit unsigned pixel difference d to an 8-bit unsigned pixel value p may result in an overflow into the 9th bit (i.e., the least significant bit (LSB) of the next higher 8-bit field of the 32-bit register). Such an overflow will occur if the resulting unsigned sum has a value greater than 255.

To handle this overflow condition and to adjust for the fact that the pixel differences d are represented by unsigned values, means 108 subtracts 128 from the value in field ax and then clamps the result to be between 0 and 255 to generate the pixel value $c_i$ for the current frame. Means 110 then shifts register ear right 16 bits and means 112 subtracts 128 from the shifted value in field ax and clamps the result to be between 0 and 255 to generate the pixel value $c_j$ for the current frame. In a preferred embodiment, the subtraction and clamping of means 108 and 110 are implemented by a lookup to a table that maps undecremented, unclamped values to the corresponding decremented, clamped values.

The processing of means 102–112 is preferably repeated for each pair of pixel values in each row of each component frame of the current frame of video data to complete the vector dequantization for the current frame. The decoded current image frame may then be displayed on a display monitor.

Figure 2:
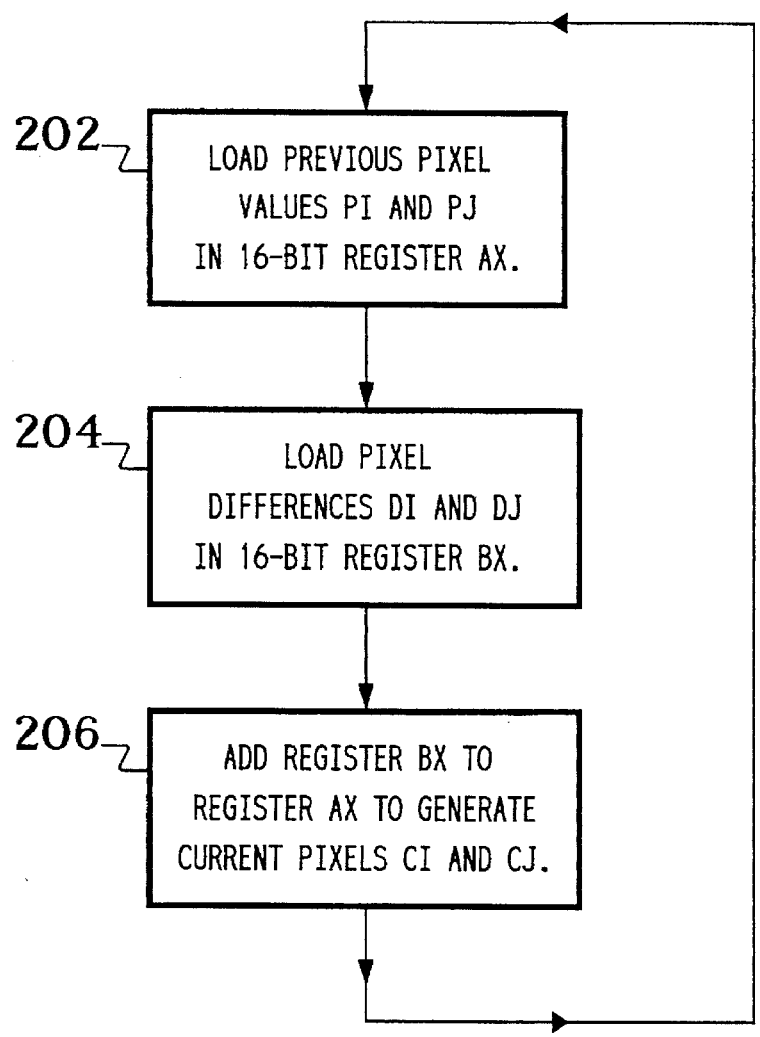
FIG. 2 is a process flow diagram of the processing implemented by a vector dequantization system, according to an alternative preferred embodiment of the present invention.

Referring now to FIG. 2, there is shown a process flow diagram of the processing implemented by vector dequantization system 200, according to an alternative preferred embodiment of the present invention. System 200 is preferably implemented on a non-parallel 32-bit processor such as an Intel® 386, 486, or Pentium® microprocessor. Those skilled in the art will understand that system 200 may also be implemented on other processors such as a 16-bit processor.

In the preferred embodiment in which system 200 is implemented on a 32-bit processor, system 200 may process up to four 8-bit pixels at a time in a pseudo-SIMD fashion. For purposes of explanation in this specification, however, system 200 is described in terms of processing two pixels at a time in a pseudo-SIMD fashion using 16-bit registers ax and bx. Register ax contains 8-bit low field al and 8-bit high field ah. Each of register ax and fields al and ah may be addressed directly. Register bx has analogous 8-bit fields bl and bh. Those skilled in the art will understand that the principles of the described two-pixel, 16-bit implementation may be applied to the preferred four-pixel, 32-bit implementation.

Like system 100, system 200 implements vector dequantization processing to decode encoded video images in a pseudo-SIMD fashion. System 200 accomplishes this pseudo-SIMD vector dequantization processing by (1) loading two 8-bit pixel values corresponding to two pixels of the previous frame into 16-bit register ax, (2) loading a 16-bit value corresponding to two 8-bit pixel differences associated with the corresponding two pixels of the current frame into 16-bit register bx, and then (3) applying an addition operation to the loaded registers, where the data loaded in the registers are treated like single 16-bit values, to generate values corresponding to the two pixels of the current frame.

More particularly, means 202 of system 200 loads 8-bit unsigned pixel values $p_i$ and $p_j$ into 16-bit register ax. Pixel values $p_i$ and $p_j$ are preferably components (e.g., Y, U, or V) of two pixels of the previous frame of video dam. Means 202 preferably (1) loads pixel value $p_j$ directly into field ah of register ax and (2) loads pixel value $p_i$ directly into field al.

Means 204 loads values corresponding to pixel differences $d_i$ and $d_j$ for the current video frame into fields bl and bh of 16-bit register bx, respectively. In a preferred embodiment, means 204 retrieves these difference values as a single 16-bit value stored in a dequantization table.

Means 206 then performs an addition operation on registers ax and bx to add the contents of register bx to the contents of register at. The resulting 8-bit values in fields al and ah of register ax are the pixel values $c_i$ and $c_j$ for the current frame, respectively.

The processing of means 202–206 is preferably repeated for each pair of pixel values in each row of each component frame of the current frame of video data to complete the vector dequantization for the current frame. The decoded current image frame may then be displayed on a display monitor.

In system 200, pixel values p are preferably represented as 8-bit unsigned values (i.e., from 0 to 255) and pixel differences d are preferably represented as 8-bit signed (i.e., twos-complement) values (i.e., from −128 to +127). System 200 is designed to ensure that, when an 8-bit unsigned pixel value p is added to an 8-bit signed pixel difference d, the resulting 8 least significant bits (LSBs) correspond to the correct 8-bit unsigned pixel value c. This requires system 200 to handle certain circumstances to prevent erroneous results.

If the unsigned value p is greater than 127 and the signed difference d is positive, then the resulting unsigned sum may be greater than 255. If the resulting sum is greater than 255, then there is a spillover into the 9th bit and the resulting 8 LSBs do not correspond to the correct 8-bit unsigned pixel value c. For example, if p is 255 or (1111 1111) and d is +1 or (0000 0001), the result is 256 or (10000 0000). System 200 relies upon vector quantization processing to generate encoded dam that avoids the overflow problem due to a resulting unsigned sum having a value greater than 255. That is, the vector quantization processing ensures that the vector dequantization of system 200 will not generate unsigned sums greater than 255.

If the unsigned value p is less than 128 and the signed difference d is negative, then the resulting unsigned sum may be less than 0. If the resulting sum is less than 0, then the resulting 8 LSBs do not correspond to the correct 8-bit unsigned pixel value c. For example, when p is 1 or (0000 0001) and d is −2 or (1111 1110), the resulting 8 LSBs are (1111 1111), which corresponds to an unsigned value of 255. System 200 relies upon vector quantization processing to generate encoded data that avoids the problem of a resulting sum having a value less than 0. That is, the vector quantization processing ensures that the vector dequantization of system 200 will not generate sums less than 0.

When system 200 relies upon vector quantization processing to prevent sums greater than 255 and less than 0, the resulting 8 LSBs will always correspond to the correct 8-bit unsigned sum. However, when the signed difference d is less than 0, there will be a spillover into the 9th bit. For example, when p is +2 or (0000 0010) and d is −1 or (1111 1111), the resulting sum is (1 0000 0001). The resulting 8 LSBs correctly correspond to the 8-bit unsigned value for +1, but there is a spillover to the 9th bit. Under other circumstances this spillover may be ignored, but, in system 200, the 9th bit may correspond to the LSB of the dequantization sum for the adjacent pixel and the spillover may corrupt the dequantization processing for that pixel.

For example, assume that previous pixels $p_i$ and g are 10 (i.e., 0000 1010) and 12 (i.e., 0000 1100), respectively, and that corresponding current pixels $c_i$ and $c_j$ are 8 and 10, respectively. During vector quantization processing, current pixels $c_i$ and $c_j$ may both be encoded based on pixel differences $d_i$ and $d_j$ of −2 (i.e., 1111 1110).

In this example, during dequantization, means 202 of system 200 loads the previous pixels $p_i$ and $p_j$ into 16-bit register ax as the single value:

(0000 1010 0000 1100).

If means 204 were to load the pixel differences $d_i$ and $d_j$ into 16-bit register bx as the single value:

(1111 1110 1111 1110), then means 206 would add register bx to register ax to generate the 16-bit value:

(0000 1001 0000 1010), which corresponds to current 8-bit pixel values $c_i$ and $c_j$ of 9 and 10, respectively. In this case, current pixel $c_i$ would be miscalculated as 9 instead of 8 because of the spillover from the calculation for current pixel $c_j$.

In order to avoid this problem, whenever pixel difference $d_j$ is negative, the value used for pixel difference $d_i$ in dequantization processing is one less than the actual value of pixel difference $d_i$ determined during quantization processing. Thus, for the current example, means 204 preferably loads register bx with the 16-bit value:

(1111 1101 1111 1110), which corresponds to 8-bit differences of −3 and −2, respectively. Then, when means 206 adds register bx to register ax, the resulting 16-bit sum will be the value:

(0000 1000 0000 1010), which corresponds to the correct current 8-bit pixel values $c_i$ and $c_j$ of 8 and 10, respectively.

In a preferred embodiment, the pixel differences $d_i$ and $d_j$ are stored as 16-bit values in a dequantization table. The dequantization table is generated off line to contain values that take into account the spillover into the 9th bit when $d_j$ is negative. That is, whenever difference $d_j$ is negative, the value stored in the upper 8 bits of the 16-bit entry in the dequantization table is one less than the actual value for difference $d_i$. In that preferred embodiment, means 204 loads register bx using a table lookup to the dequantization table.

Those skilled in the art will understand that the present invention may be used to implement pseudo-SIMD processing techniques on conventional non-parallel processors, other than the vector dequantization implemented by systems 100 and 200. In other words, operations other than addition may be applied in a pseudo-SIMD fashion to two or more pixels stored in a single register.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A computer-implemented process for transforming signals corresponding to pixel images, comprising the steps of:

(a) providing a first signal corresponding to a first pixel of an image;

(b) providing a second signal corresponding to a second pixel of the image;

(c) loading a first value corresponding to the first signal into a first register of a non-parallel processor;

(d) loading a second value corresponding to the second signal into the first register; and (e) transforming the first and second signals by performing an operation on the first register, wherein the operation is applied to the first and second values in parallel, wherein the processor treats the contents of the first register as a single value throughout the performance of the operation, wherein:

step (a) comprises the step of providing a first previous signal corresponding to a first previous pixel of a previous image;

step (b) comprises the step of providing a second previous signal corresponding to a second previous pixel of the previous image;

step (c) comprises the step of loading a first previous pixel value $p_1$ corresponding to the first previous pixel into the first register;

step (d) comprises the step of loading a second previous pixel value $p_2$ corresponding to the second previous pixel into the first register;

further comprising the steps of:

(f) providing a first difference signal corresponding to a current image;

(g) providing a second difference signal corresponding to the current image:

(h) loading a first difference value $d_1$ corresponding to the first difference signal into a second register of the non-parallel processor;

(i) loading a second difference value $d_2$ corresponding to the second difference signal into the second register;

step (e) comprises the steps of:

(1) generating a first current pixel value $c_1$ and a second current pixel value $c_2$ by adding the contents of the first register and the contents of the second register in a single operation; and (2) generating a first current signal in accordance with the first current pixel value $c_1$ and a second current signal in accordance with the second current pixel value $c_2$, wherein the first and second current signals correspond to two pixels of the current image; and steps (h) and (i) comprise the step of loading the first and second difference values $d_1$ and $d_2$ into the second register in a single table lookup operation.

2. The process of claim 1, wherein:

step (c) comprises the steps of:

(1) loading the first previous pixel value $p_1$ into the first register; and (2) shifting the contents of the first register left; and step (d) comprises the step of loading the second previous pixel value $p_2$ into the first register.

3. The process of claim 1, wherein the first pixel difference value $d_1$ has been adjusted to compensate for spillover when the second pixel difference value $d_2$ is less than zero.

4. An apparatus for transforming signals corresponding to pixel images, comprising:

(a) means for providing a first signal corresponding to a first pixel of an image;

(b) means for providing a second signal corresponding to a second pixel of the image;

(c) means for loading a first value corresponding to the first signal into a first register of a non-parallel processor;

(d) means for loading a second value corresponding to the second signal into the first register; and (e) means for transforming the first and second signals by performing an operation on the first register, wherein the operation is applied to the first and second values in parallel, wherein means (e) treats the contents of the first register as a single value throughout the performance of the operation, wherein:

means (a) comprises means for providing a first previous signal corresponding to a first previous pixel of a previous image;

means (b) comprises means for providing a second previous signal corresponding to a second previous pixel of the previous image;

means (c) comprises means for loading a first previous pixel value $p_1$ corresponding to the first previous pixel into the first register;

means (d) comprises means for loading a second previous pixel value $p_2$ corresponding to the second previous pixel into the first register;

further comprising:

(f) means for providing a first difference signal corresponding to a current image;

(g) means for providing a second difference signal corresponding to the current image;

(h) means for loading a first difference value $d_1$ corresponding to the first difference signal into a second register of the non-parallel processor;

(i) means for loading a second difference value $d_2$ corresponding to the second difference signal into the second register;

means (e) comprises:

(1) means for generating a first current pixel value $c_1$ and a second current pixel value $c_2$ by adding the contents of the first register and the contents of the second register in a single operation; and (2) means for generating a first current signal in accordance with the first current pixel $c_1$ and a second current signal in accordance with the second current pixel value $c_2$, wherein the first and second current signals correspond to two pixels of the current image; and means (h) and (i) comprise means for loading the first and second difference values $d_1$ and $d_2$ into the second register in a single table lookup operation.

5. The apparatus of claim 4, wherein:

means (c) comprises:

(1) means for loading the first previous pixel value $p_1$ into the first register; and (2) means for shifting the contents of the first register left; and means (d) comprises means for loading the second previous pixel value $p_2$ into the first register.

6. The apparatus of claim 4, wherein the first pixel difference value $d_1$ has been adjusted to compensate for spillover when the second pixel difference value $d_2$ is less than zero.

7. A non-parallel processor for transforming signals corresponding to pixel images, comprising:

(a) a first register; and (b) means for performing an operation on the first register, wherein:

a first value corresponding to a first pixel of an image is loaded into the first register;

a second value corresponding to a second pixel of the image is loaded into the first register; and means (b) transforms the first and second values by performing the operation on the first register, wherein the operation is applied to the first and second values in parallel, wherein the processor treats the contents of the first register as a single value throughout the performance of the operation, further comprising a second register, wherein:

the first value corresponds to a first previous pixel $p_1$ of a previous image;

the second value corresponds to a second previous pixel $p_2$ of the previous image;

a first difference value $d_1$ corresponding to a current image is loaded into the second register;

a second difference value $d_2$ corresponding to the current image is loaded into the second register;

means (b) generates a first current pixel value $c_1$ and a second current pixel value $c_2$ by adding the contents of the first register and the contents of the second register in a single operation;

means (b) generates a first current signal in accordance with the first current pixel value $c_1$ and a second current signal in accordance with the second current pixel value $c_2$, wherein the first and second current signals correspond to two pixels of the current image; and the first and second difference values $d_1$ and $d_2$ are loaded into the second register in a single table lookup operation.

8. The processor of claim 7, wherein:

the first previous pixel value $p_1$ is loaded into the first register; and the contents of the first register are then shifted left; and the second previous pixel value $p_2$ is then loaded into the first register.

9. The processor of claim 7, wherein the first pixel difference value $d_1$ has been adjusted to compensate for spillover when the second pixel difference value $d_2$ is less than zero.

10. A computer-implemented process for transforming signals, comprising the steps of:

(a) loading a first signal value into a first register of a non-parallel processor;

(b) loading a second signal value into the first register;

(c) loading a third signal value into a second register of the non-parallel processor;

(d) loading a fourth signal value into the second register;

(e) transforming the first and second signal values by summing together the contents of the first register and the contents of the second register to generate first and second transformed signal values, wherein:

the processor treats the contents of each of the first and second registers as a single value throughout the performance of the summing operation; and the third signal value has been adjusted to compensate for spillover when the fourth signal value is less than zero.

11. The process of claim 10, wherein steps (c) and (d) comprise the step of loading the third and fourth signal values into the second register in a single table lookup operation.

12. The process of claim 10, wherein the first and second signal values correspond to pixels of an image and the third and fourth signal values correspond to pixel differences.

13. An apparatus for transforming signals, comprising:

(a) means for loading a first signal value into a first register of a non-parallel processor;

(b) means for loading a second signal value into the first register;

means for loading a third signal value into a second register of the non-parallel processor;

(d) means for loading a fourth signal value into the second register;

(e) means for transforming the first and second signal values by summing together the contents of the first register and the contents of the second register to generate first and second transformed signal values, wherein:

the processor treats the contents of each of the first and second registers as a single value throughout the performance of the summing operation; and the third signal value has been adjusted to compensate for spillover when the fourth signal value is less than zero.

14. The apparatus of claim 13, wherein means (c) and (d) load the third and fourth signal values into the second register in a single table lookup operation.

15. The apparatus of claim 13, wherein the first and second signal values correspond to pixels of an image and the third and fourth signal values correspond to pixel differences.

16. A non-parallel processor for transforming signals, comprising:

(a) a first register;

(b) a second register; and (c) means for summing together the contents of the first register and the contents of the second register, wherein:

a first signal value is loaded into the first register;

a second signal value is loaded into the first register;

a third signal value is loaded into the second register;

a fourth signal value is loaded into the second register;

means (c) transforms the first and second signal values by summing together the contents of the first register and the contents of the second register to generate first and second transformed signal values, wherein:

means (c) treats the contents of each of the first and second registers as a single value throughout the performance of the summing operation; and the third signal value has been adjusted to compensate for spillover when the fourth signal value is less than zero.

17. The processor of claim 16, wherein the third and fourth signal values are loaded into the second register in a single table lookup operation.

18. The processor of claim 16, wherein the first and second signal values correspond to pixels of an image and the third and fourth signal values correspond to pixel differences.

* * * * *